United States Patent
Richardson et al.

(10) Patent No.: US 8,060,616 B1
(45) Date of Patent: Nov. 15, 2011

(54) MANAGING CDN REGISTRATION BY A STORAGE PROVIDER

(75) Inventors: David R. Richardson, Seattle, WA (US); Bradley E. Marshall, Bainbridge Island, WA (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 318 days.

(21) Appl. No.: 12/272,666

(22) Filed: Nov. 17, 2008

(51) Int. Cl.
*G06F 15/173* (2006.01)

(52) U.S. Cl. ....................................... 709/226

(58) Field of Classification Search .................... 709/226
See application file for complete search history.

(56) References Cited

U.S. PATENT DOCUMENTS

| | | | |
|---|---|---|---|
| 5,341,477 A | 8/1994 | Pitkin et al. | |
| 5,611,049 A | 3/1997 | Pitts | |
| 5,774,660 A | 6/1998 | Brendel et al. | |
| 5,892,914 A | 4/1999 | Pitts | |
| 6,016,512 A | 1/2000 | Huitema | |
| 6,026,452 A | 2/2000 | Pitts | |
| 6,052,718 A | 4/2000 | Gifford | |
| 6,085,234 A | 7/2000 | Pitts et al. | |
| 6,098,096 A | 8/2000 | Tsirigotis et al. | |
| 6,108,703 A | 8/2000 | Leighton et al. | |
| 6,182,111 B1 | 1/2001 | Inohara et al. | |
| 6,205,475 B1 | 3/2001 | Pitts | |
| 6,286,084 B1 | 9/2001 | Wexler et al. | |
| 6,304,913 B1 | 10/2001 | Rune | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,457,047 B1 | 9/2002 | Chandra et al. | |
| 6,484,143 B1 | 11/2002 | Swildens et al. | |
| 6,505,241 B2 | 1/2003 | Pitts | |
| 6,553,413 B1 | 4/2003 | Leighton et al. | |
| 6,654,807 B2 | 11/2003 | Farber et al. | |
| 6,678,791 B1 | 1/2004 | Jacobs et al. | |
| 6,694,358 B1 | 2/2004 | Swildens et al. | |

(Continued)

OTHER PUBLICATIONS

Baglioni et al., "Preprocessing and Mining Web Log Data for Web Personalization", LNAI 2829, 2003, pp. 237-249.

(Continued)

*Primary Examiner* — John Follansbee
*Assistant Examiner* — Imad Hussain
(74) *Attorney, Agent, or Firm* — Knobbe Martens Olson & Bear, LLP

(57) ABSTRACT

A system, method, and computer readable medium for managing registration, by a network storage provider, of one or more resources with a CDN service provider are provided. A network storage provider storing one or more resources on behalf of a content provider obtains registration information for registering the one or more resources with a CDN service provider. The registration information may include a request to publish one or more resources to a CDN service provider, an identification of the one or more resources, CDN selection criteria provided by the content provider or otherwise selected, and the like. The network storage provider transmits a CDN generation request corresponding to the registration information to the CDN service provider. Then, the network storage provider manages and processes data pursuant to registration of the one or more resources with the CDN service provider. The process can further include causing the generation of a user interface by the network storage provider for requesting registration of the one or more resources with a CDN service provider using a single control.

32 Claims, 8 Drawing Sheets

U.S. PATENT DOCUMENTS

| | | |
|---|---|---|
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,963,850 B1 | 11/2005 | Bezos et al. |
| 6,981,017 B1 | 12/2005 | Kasriel et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,058,706 B1 | 6/2006 | Iyer et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 * | 8/2006 | Chase et al. ............... 709/223 |
| 7,103,645 B2 | 9/2006 | Leighton et al. |
| 7,117,262 B2 | 10/2006 | Bai et al. |
| 7,133,905 B2 | 11/2006 | Dilley et al. |
| 7,146,560 B2 | 12/2006 | Dang et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,233,978 B2 | 6/2007 | Overton et al. |
| 7,240,100 B1 | 7/2007 | Wein et al. |
| 7,260,598 B1 | 8/2007 | Liskov et al. |
| 7,269,784 B1 | 9/2007 | Kasriel et al. |
| 7,310,686 B2 | 12/2007 | Uysal |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,548,947 B2 | 6/2009 | Kasriel et al. |
| 7,552,235 B2 | 6/2009 | Chase et al. |
| 7,573,916 B1 | 8/2009 | Bechtolsheim et al. |
| 7,624,169 B2 | 11/2009 | Lisiecki et al. |
| 7,653,700 B1 | 1/2010 | Bahl et al. |
| 7,657,622 B1 * | 2/2010 | Douglis et al. ............... 709/224 |
| 7,680,897 B1 | 3/2010 | Carter et al. |
| 7,702,724 B1 * | 4/2010 | Brydon et al. ............... 709/203 |
| 7,739,400 B2 | 6/2010 | Lindbo et al. |
| 7,747,720 B2 | 6/2010 | Toebes et al. |
| 7,756,913 B1 * | 7/2010 | Day ........................ 707/821 |
| 7,761,572 B1 | 7/2010 | Auerbach |
| 7,774,342 B1 | 8/2010 | Virdy |
| 7,792,989 B2 | 9/2010 | Toebes et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,912,921 B2 | 3/2011 | O'Rourke et al. |
| 7,925,782 B2 | 4/2011 | Sivasubramanian et al. |
| 7,962,597 B2 | 6/2011 | Richardson et al. |
| 2001/0034704 A1 * | 10/2001 | Farhat et al. ............... 705/39 |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 * | 5/2002 | Swildens et al. ............... 709/223 |
| 2002/0062372 A1 | 5/2002 | Hong et al. |
| 2002/0068554 A1 | 6/2002 | Dusse |
| 2002/0078233 A1 * | 6/2002 | Biliris et al. ............... 709/238 |
| 2002/0087374 A1 * | 7/2002 | Boubez et al. ............... 705/7 |
| 2002/0092026 A1 | 7/2002 | Janniello et al. |
| 2002/0099616 A1 | 7/2002 | Sweldens |
| 2002/0101836 A1 | 8/2002 | Dorenbosch |
| 2002/0129123 A1 | 9/2002 | Johnson et al. |
| 2002/0138286 A1 | 9/2002 | Engstrom |
| 2002/0147770 A1 | 10/2002 | Tang |
| 2002/0188722 A1 | 12/2002 | Banerjee et al. |
| 2003/0002484 A1 | 1/2003 | Freedman |
| 2003/0009591 A1 | 1/2003 | Hayball et al. |
| 2003/0037139 A1 * | 2/2003 | Shteyn ........................ 709/225 |
| 2003/0065739 A1 | 4/2003 | Shnier |
| 2003/0074401 A1 * | 4/2003 | Connell et al. ............... 709/203 |
| 2003/0101278 A1 | 5/2003 | Garcia-Luna-Aceves et al. |
| 2003/0133554 A1 * | 7/2003 | Nykanen et al. ........... 379/201.01 |
| 2003/0135509 A1 | 7/2003 | Davis et al. |
| 2003/0140087 A1 | 7/2003 | Lincoln et al. |
| 2003/0145066 A1 | 7/2003 | Okada et al. |
| 2003/0149581 A1 * | 8/2003 | Chaudhri et al. ............... 705/1 |
| 2003/0163722 A1 | 8/2003 | Anderson, IV |
| 2003/0172183 A1 | 9/2003 | Anderson, IV et al. |
| 2003/0187935 A1 | 10/2003 | Agarwalla et al. |
| 2003/0187970 A1 * | 10/2003 | Chase et al. ............... 709/223 |
| 2003/0191822 A1 | 10/2003 | Leighton et al. |
| 2003/0236700 A1 * | 12/2003 | Arning et al. ............... 705/11 |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0044791 A1 | 3/2004 | Pouzzner |
| 2004/0073867 A1 | 4/2004 | Kausik et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0172466 A1 | 9/2004 | Douglas et al. |
| 2004/0203630 A1 | 10/2004 | Wang |
| 2004/0205149 A1 | 10/2004 | Dillon et al. |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1 * | 1/2005 | McCanne ........................ 709/219 |
| 2005/0038967 A1 | 2/2005 | Umbehocker et al. |
| 2005/0044270 A1 | 2/2005 | Grove et al. |
| 2005/0108169 A1 * | 5/2005 | Balasubramanian et al. .. 705/50 |
| 2005/0132083 A1 | 6/2005 | Raciborski et al. |
| 2005/0188073 A1 | 8/2005 | Nakamichi et al. |
| 2005/0192008 A1 * | 9/2005 | Desai et al. ............... 455/435.2 |
| 2005/0232165 A1 | 10/2005 | Brawn et al. |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2006/0013158 A1 | 1/2006 | Ahuja et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0064500 A1 | 3/2006 | Roth et al. |
| 2006/0074750 A1 | 4/2006 | Clark et al. |
| 2006/0075139 A1 | 4/2006 | Jungck |
| 2006/0083165 A1 * | 4/2006 | McLane et al. ............... 370/229 |
| 2006/0112176 A1 | 5/2006 | Liu et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0190605 A1 * | 8/2006 | Franz et al. ............... 709/226 |
| 2006/0193247 A1 | 8/2006 | Naseh et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0265508 A1 | 11/2006 | Angel et al. |
| 2006/0265516 A1 | 11/2006 | Schilling |
| 2006/0265720 A1 * | 11/2006 | Cai et al. ............... 719/330 |

| | | |
|---|---|---|
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0014241 A1 | 1/2007 | Banerjee et al. |
| 2007/0041393 A1 | 2/2007 | Westhead et al. |
| 2007/0050522 A1 | 3/2007 | Grove et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0174426 A1* | 7/2007 | Swildens et al. ............. 709/217 |
| 2007/0183342 A1 | 8/2007 | Wong et al. |
| 2007/0208737 A1 | 9/2007 | Li et al. |
| 2007/0244964 A1 | 10/2007 | Challenger et al. |
| 2007/0266113 A1 | 11/2007 | Koopmans et al. |
| 2008/0005057 A1 | 1/2008 | Ozzie et al. |
| 2008/0008089 A1 | 1/2008 | Bornstein et al. |
| 2008/0046596 A1 | 2/2008 | Afergan et al. |
| 2008/0071987 A1 | 3/2008 | Karn et al. |
| 2008/0072264 A1 | 3/2008 | Crayford |
| 2008/0086574 A1 | 4/2008 | Raciborski et al. |
| 2008/0147866 A1 | 6/2008 | Stolorz et al. |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0228920 A1 | 9/2008 | Souders et al. |
| 2008/0235400 A1 | 9/2008 | Slocombe et al. |
| 2008/0275772 A1* | 11/2008 | Suryanarayana et al. ...... 705/14 |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0049098 A1 | 2/2009 | Pickelsimer et al. |
| 2009/0070533 A1 | 3/2009 | Elazary et al. |
| 2009/0086741 A1* | 4/2009 | Zhang et al. .................. 370/401 |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0144412 A1 | 6/2009 | Ferguson et al. |
| 2009/0157850 A1 | 6/2009 | Gagliardi et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0204682 A1 | 8/2009 | Jeyaseelan et al. |
| 2009/0210549 A1 | 8/2009 | Hudson et al. |
| 2009/0248786 A1* | 10/2009 | Richardson et al. .......... 709/201 |
| 2009/0248787 A1* | 10/2009 | Sivasubramanian et al. . 709/201 |
| 2009/0248852 A1 | 10/2009 | Fuhrmann et al. |
| 2009/0248858 A1* | 10/2009 | Sivasubramanian et al. . 709/224 |
| 2009/0248893 A1* | 10/2009 | Richardson et al. .......... 709/239 |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1* | 11/2009 | Ravindran et al. ............ 370/252 |
| 2009/0287750 A1 | 11/2009 | Banavar et al. |
| 2009/0307307 A1 | 12/2009 | Igarashi |
| 2009/0327517 A1* | 12/2009 | Sivasubramanian et al. . 709/238 |
| 2010/0005175 A1 | 1/2010 | Swildens et al. |
| 2010/0011061 A1 | 1/2010 | Hudson et al. |
| 2010/0023601 A1* | 1/2010 | Lewin et al. .................. 709/218 |
| 2010/0030662 A1 | 2/2010 | Klein |
| 2010/0036944 A1* | 2/2010 | Douglis et al. ................ 709/224 |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0122069 A1 | 5/2010 | Gonion |
| 2010/0125673 A1* | 5/2010 | Richardson et al. .......... 709/239 |
| 2010/0125675 A1* | 5/2010 | Richardson et al. .......... 709/242 |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0332595 A1 | 12/2010 | Fullagar et al. |
| 2011/0078000 A1* | 3/2011 | Ma et al. ......................... 705/10 |

OTHER PUBLICATIONS

Liu et al., "Combined mining of Web server logs and web contents for classifying user navigation patterns and predicting users' future requests," Data & Knowledge Engineering 61 (2007) pp. 304-330.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

* cited by examiner

MANAGING CDN REGISTRATION BY A STORAGE PROVIDER

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintains a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to managing registration of a content provider or one or more resources associated with a content provider with a content delivery network ("CDN") service provider. Specifically, aspects of the disclosure will be described with regard to the management and processing of CDN registration requests made to a network storage provider by a content provider. Although various aspects of the disclosure will be described with regard to illustrative examples and embodiments, one skilled in the art will appreciate that the disclosed embodiments and examples should not be construed as limiting.

Figure 1:
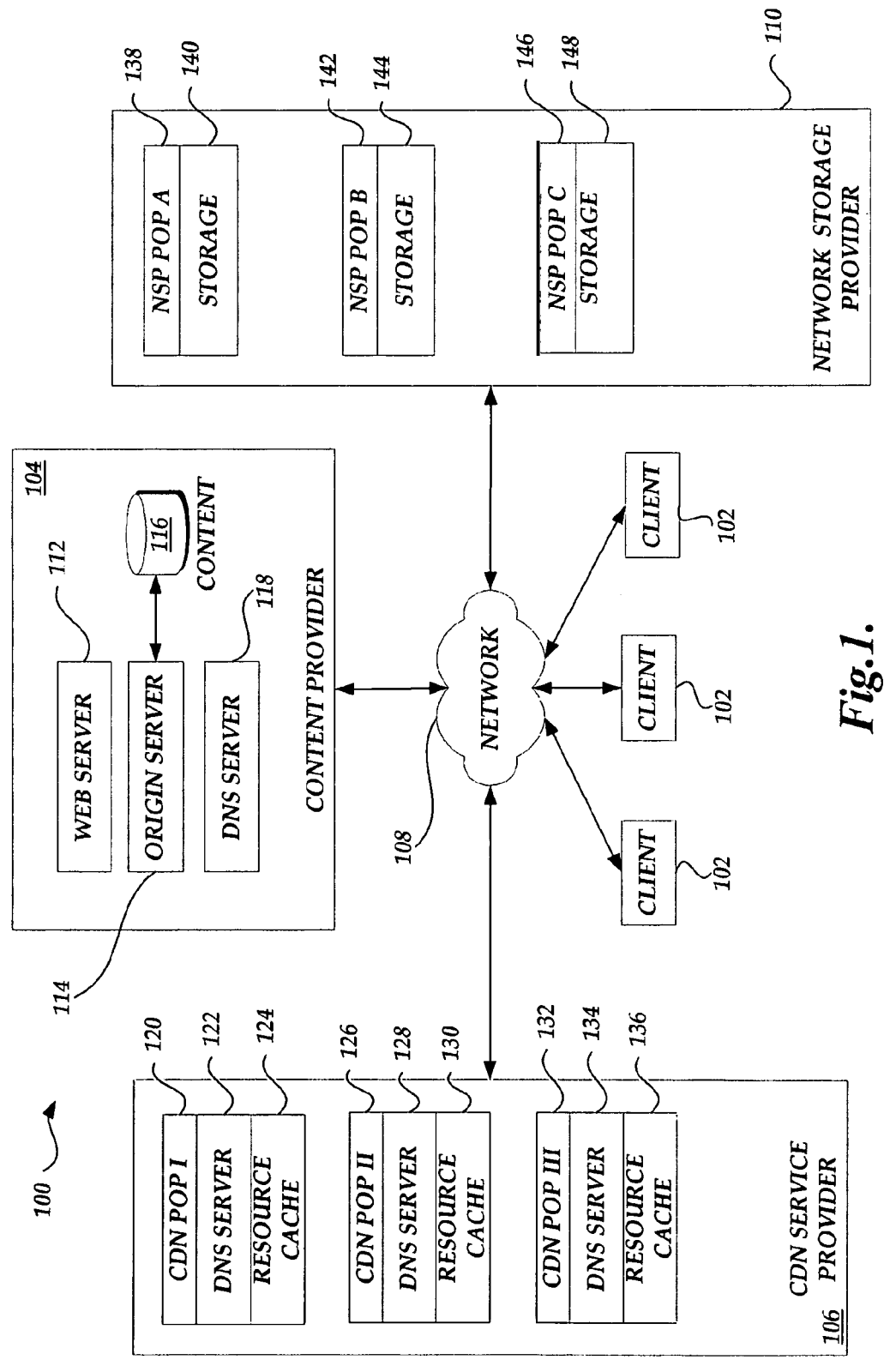
FIG. 1 is a block diagram illustrative of content delivery environment including a number of client computing devices, a content provider, a network storage provider, and a content delivery network service provider.

FIG. 1 is a block diagram illustrative of content delivery environment 100 for the managing registration of content with a CDN service provider and subsequent processing of content requests. As illustrated in FIG. 1, the content delivery environment 100 includes a number of client computing devices 102 (generally referred to as clients) for requesting content from a content provider, a network storage provider 110, and/or a CDN service provider 106. In an illustrative embodiment, the client computing devices 102 can correspond to a wide variety of computing devices including personal computing devices, laptop computing devices, handheld computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS name servers, and the like. For example, as further illustrated in FIG. 1, the content provider 104 can be associated with one or more DNS name server components 118 that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address.

With continued reference to FIG. 1, the content delivery environment 100 can further include a CDN service provider 106 in communication with the one or more client computing devices 102, the content provider 104, and the network storage provider 110 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a DNS component 122, 128, 134 made up of a number of DNS server computing devices for resolving DNS queries from the client computers 102. Each POP 120, 126, 132 also includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited to, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the CDN service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142, 146 that correspond to nodes on the communication network 108. Each NSP POP 138, 142, 146 includes a storage component 140, 144, 148 made up of a number of storage devices for storing resources from content providers which will be processed by the network storage provider 110 and transmitted to various client computers. The storage components 140, 144, 148 may further include additional software and/or hardware components that facilitate communications including, but not limited to, load balancing or load sharing software/hardware components.

In an illustrative embodiment, the storage components 140, 144, 148 are considered to be logically grouped, regardless of whether the components, or portions of the components, are physically separate. Additionally, although the NSP POPs 138, 142, 146 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such additional computing devices for administration of content and resources, DNS name servers, and the like. For example, the network storage provider 110 can be associated with one or more DNS name server components that are operative to receive DNS queries related to registered domain names associated with the network storage provider 110. The one or more DNS name servers can be authoritative to resolve client computing device DNS queries corresponding to the registered domain names of the network storage provider 110. As similarly set forth above, a DNS name server component is considered to be authoritative to a DNS query if the DNS name server can resolve the query by providing a responsive IP address.

Even further, one skilled in the relevant art will appreciate that the components of the network storage provider 110 and components of the CDN service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-4B, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
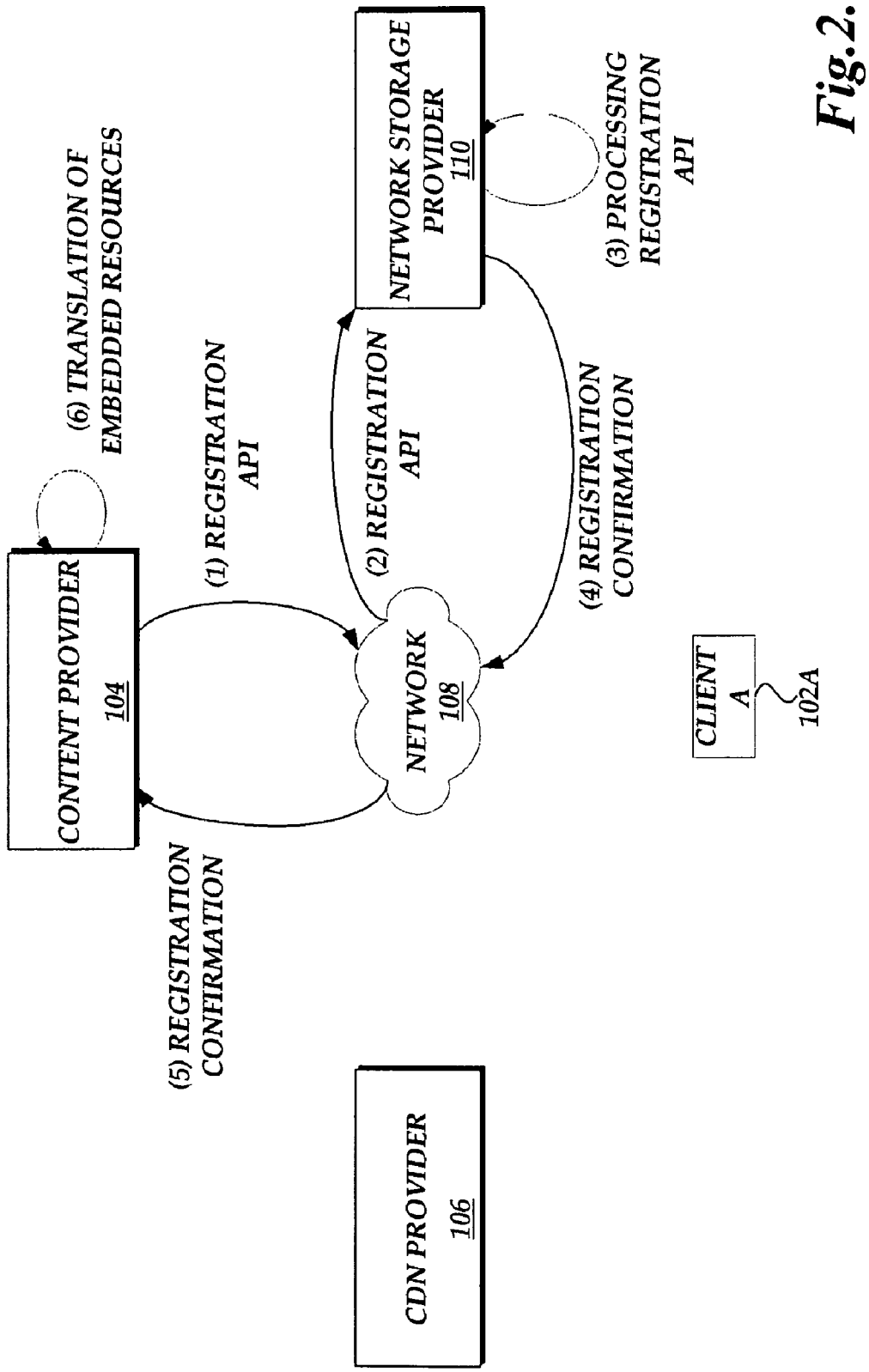
FIG. 2 is a block diagram of the content delivery environment of FIG. 1 illustrating the registration of a content provider with a network storage provider.

With reference to FIG. 2, an illustrative interaction for registration of a content provider 104 with the network storage provider 110 will be described. As illustrated in FIG. 2, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API can include the identification of the origin server 114 of the content provider 104 that may provide requested resources to the network storage provider 110. In addition or alternatively, the registration API can include the content to be stored by the network storage provider 110 on behalf of the content provider 104. In one embodiment, the network storage provider 110 may act as an origin server for the content provider 104.

One skilled in the relevant art will appreciate that upon storage of the content by the network storage provider 110, the content provider 104 can begin to direct requests for content from client computing devices 102 to the network storage provider 110. Specifically, in accordance with DNS routing principles, a client computing device request corresponding to a resource identifier would eventually be directed toward a storage component 140, 144, 148 of a NSP POP 138, 142, 146 associated with the network storage provider 110.

With continued reference to FIG. 2, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

In one embodiment, the network storage provider 110 returns an identification of applicable domains for the network storage provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 114 to a domain corresponding to the network storage provider 110. The translated URLs are embedded into requested content in a manner such that DNS queries for the translated URLs will resolve to a DNS server corresponding to the network storage provider 110 and not a DNS server corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the network storage provider 110. In one embodiment, the modified URL identifies the domain of the network storage provider 110 (e.g., "storageprovider.com"), the same name of the resource to be requested (e.g., "resource.xxx") and the same path where the resource will be found (e.g., "path"). Additionally, the modified URL can include additional processing information (e.g., "additional information"). The modified URL would have the form of:

http://additional information.storageprovider.com/path/resource.xxx

Figure 3A:
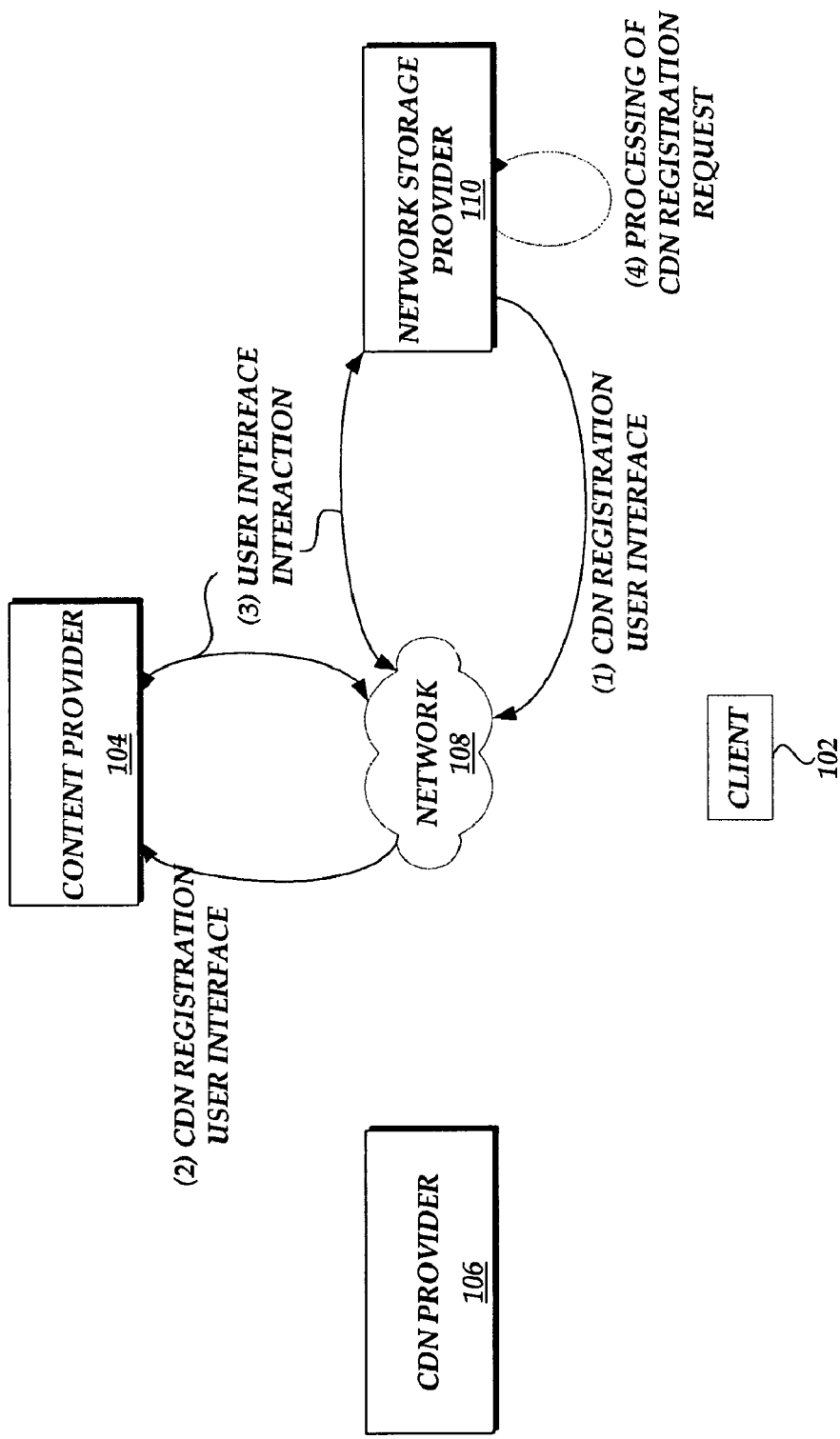
FIG. 3A is a block diagram of the content delivery environment of FIG. 1 illustrating the generation and processing of a CDN registration request from a content provider to a network storage provider.

In another embodiment, the information associated with the network storage provider 110 is included in the modified URL, such as through prepending or other techniques, such that the translated URL can maintain all of the information associated with the original URL. In this embodiment, the translated URL would have the form of:

http://additional information.storageprovider.com/www-.contentprovider.com/path/resource.xxx With reference now to FIG. 3A, after completion of the network storage provider registration and translation processes illustrated in FIG. 2, the network storage provider 110 subsequently causes the generation of a user interface or an API call to the content provider 104 for use in determining whether the content provider 104 desires to register one or more of the resources currently hosted by the network storage provider 110 with a CDN service provider. The content provider 104 receives the CDN registration user interface, such as the user interface that will be described in further detail below in reference to FIG. 6, or the API call from the network storage provider 110 via network 108. In an illustrative embodiment, the CDN registration user interface can correspond to a Web page that is displayed on a computing device associated with the content provider 104, via the processing of information, such as hypertext markup language ("HTML"), extensible markup language ("XML"), and the like. As will be described further below in reference to FIGS. 5 and 6, the CDN registration user interface provides the content provider 104 an option whether to have one or more of the resources currently hosted by the network storage provider 110 on behalf of the content provider 104 with a CDN service provider in the alternative. In the alternative, an API call would similarly provide the content provider 104 with an option to have one or more resources hosted by a CDN service provider.

In one embodiment, upon receipt of the CDN registration user interface, the content provider 104, such as through a browser software application, processes any of the markup code included in the CDN registration user interface. The CDN registration user interface provides a CDN selection component that the content provider 104 can select to send a request to the network storage provider 110 via network 108 to publish one or more resources to a CDN service provider. Upon selection of the CDN selection component, the content provider 104 sends a corresponding CDN registration request to the network storage provider 110 via network 108. As will also be further described below, other user interface interaction information may also be provided to the network storage provider 110. For example, the content provider 104 may identify various CDN selection criteria, such as a regional service plan or a service level plan associated with a CDN service provider, via the CDN registration user interface. The network storage service provider 110 receives and processes the CDN registration request together with any additional information provided by the content provider 104.

Figure 3B:
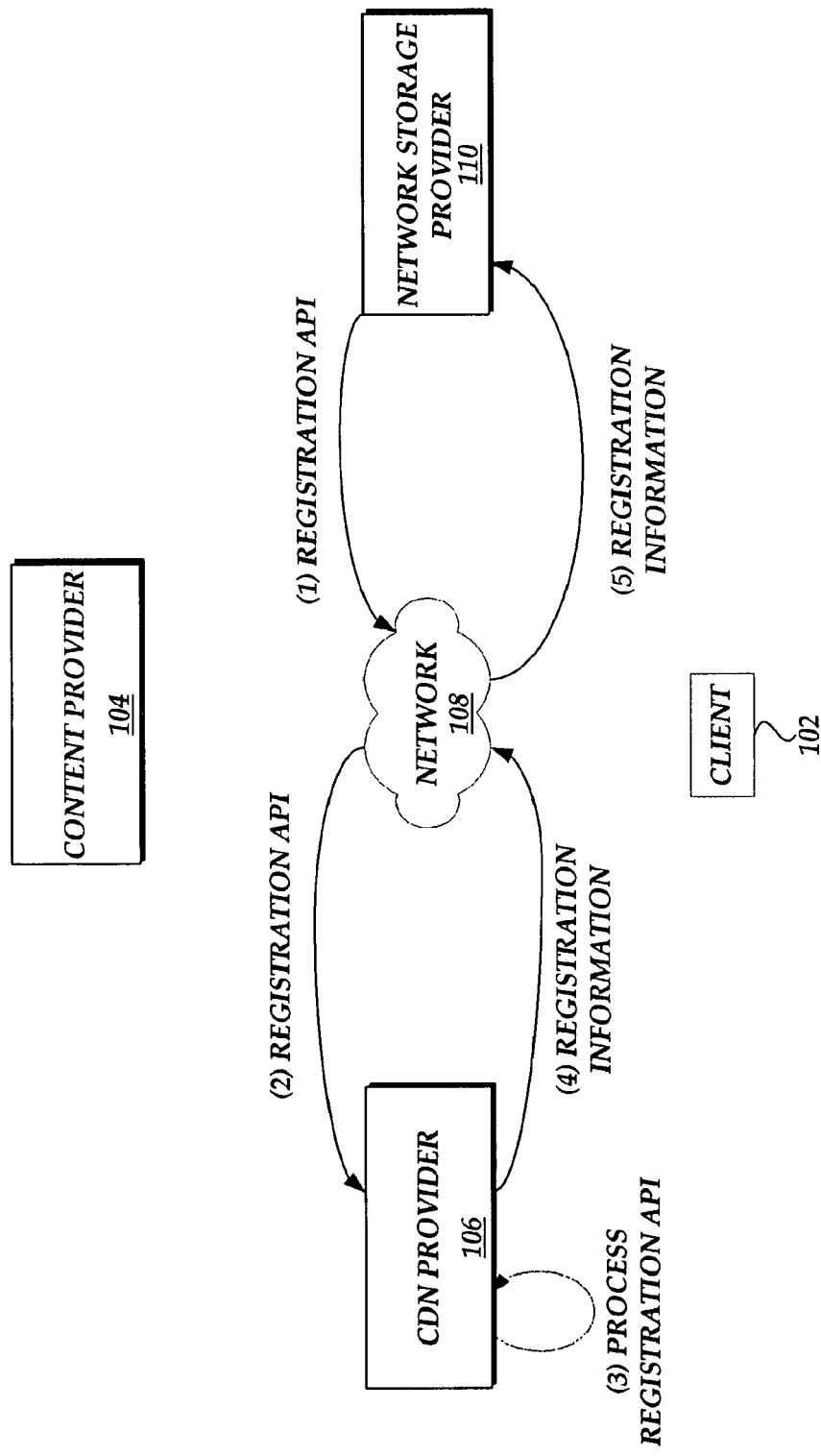
FIG. 3B is a block diagram of the content delivery environment of FIG. 1 illustrating the registration, by a network storage provider, of one or more resources with a content delivery network service provider.

With reference now to FIG. 3B, an illustrative interaction for registration, by the network storage provider 110, of the one or more resources associated with a content provider 104 with the CDN service provider 106 will be described. As illustrated in FIG. 3B, the CDN content registration process begins with registration of the one or more resources stored by the network storage provider 110 on behalf of the content provider 104 with the CDN service provider 106. In an illustrative embodiment, the network storage provider 110 utilizes a registration application program interface ("API") to register with the CDN service provider 106 such that the CDN service provider 106 can provide the one or more resources on behalf of the network storage provider 110 and further on behalf of the content provider 104. The registration API includes the identification of the storage component 140, 144, 148 of the network storage provider 110 that will provide requested resources to the CDN service provider 106.

One skilled in the relevant art will appreciate that upon identification of appropriate storage component 140, 144, 148 of the network storage provider 110, the content provider 104 can, in one embodiment as will be further described below in reference to FIG. 4A, begin to direct requests for content from client computing devices 102 to the CDN service provider 106. Specifically, in accordance with DNS routing principles, a client computing device request corresponding to a resource identifier would eventually be directed toward a POP 120, 126, 132 associated with the CDN service provider 106. In the event that the resource cache component 124, 130, 136 of a selected POP does not have a copy of a resource requested by a client computing device 102, the resource cache component will request the resource from the storage component 140, 144, 148 of the network storage provider 110 previously registered by the content provider 104.

With continued reference to FIG. 3B, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, content provider identifiers, such as content provider identification codes, CDN identifiers, such as CDN identification codes, executable code for processing resource identifiers, such as script-based instructions, and the like. One skilled in the relevant art will appreciate that various types of additional information may be generated by the CDN service provider 106 and that the additional information may be embodied in any one of a variety of formats. The CDN service provider 106 then returns an identification of applicable domains for the CDN service provider (unless it has been previously provided) and any additional information to the network storage provider 110.

Figure 4A:
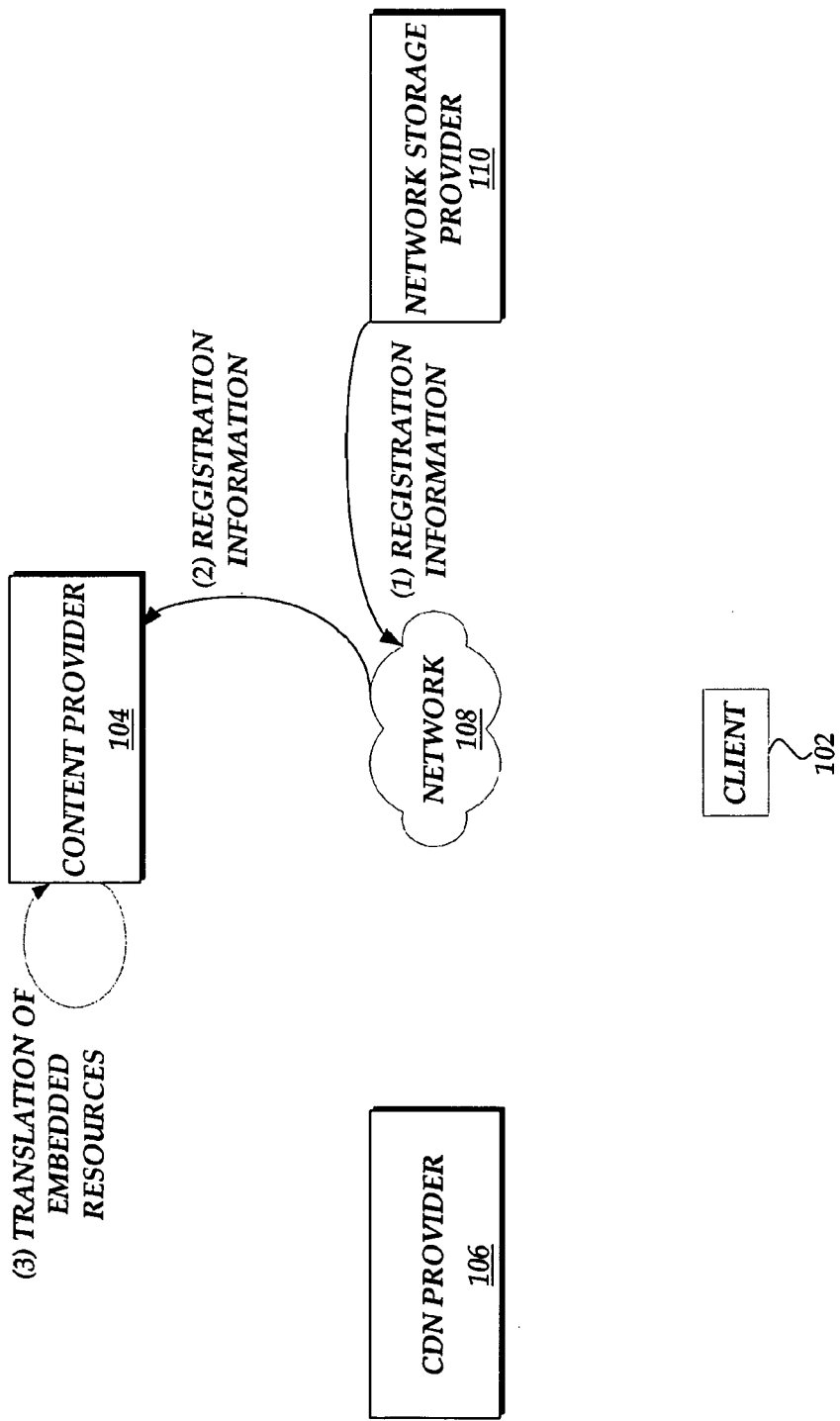
FIG. 4A is a block diagram of the content delivery environment of FIG. 1 illustrating one embodiment of the processing of resultant CDN registration information.

In turn, with reference now to FIG. 4A, in one illustrative embodiment, the network storage provider 110 can then send a request to the content provider 104 to process the stored content with CDN provider specific information. In one example, as illustrated in FIG. 4A, the content provider 104 translates resource identifiers currently directed toward a domain of the network storage provider 110 to a domain corresponding to the CDN service provider 106. The translated URLs are embedded into requested content in a manner such that DNS queries for the translated URLs will resolve to a DNS server corresponding to the CDN service provider 106 and not a DNS server corresponding to the network storage provider 110. Although the translation process is illustrated in FIG. 4A, in some embodiments, the translation process may be omitted in a manner described in greater detail below.

Generally, the identification of embedded resources currently directed to the network storage provider 110 will be in the form of an embedded resource identifier that can be processed by the client computing device 102, such as through a browser software application. As similarly set forth above, in an illustrative embodiment, the embedded resource identifiers can be in the form of a uniform resource locator ("URL"). Because one or more resources are currently associated with the network storage provider 110, the corresponding embedded resource identifiers can be referred to generally as the "network storage provider URL." For purposes of an illustrative example, the network storage provider URL can identify a domain of the network storage provider 110 (e.g., storageprovider.com), a name of the resource to be requested (e.g., "resource.xxx") and a path where the resource will be found (e.g., "path"). In this illustrative example, the network storage provider URL has the form of:

http://www.storageprovider.com/path/resource.xxx

During an illustrative translation process, the network storage provider URL is modified such that requests for the resources associated with the further translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional_information.cdnprovider.com/path/resource.xxx

Figure 4B:
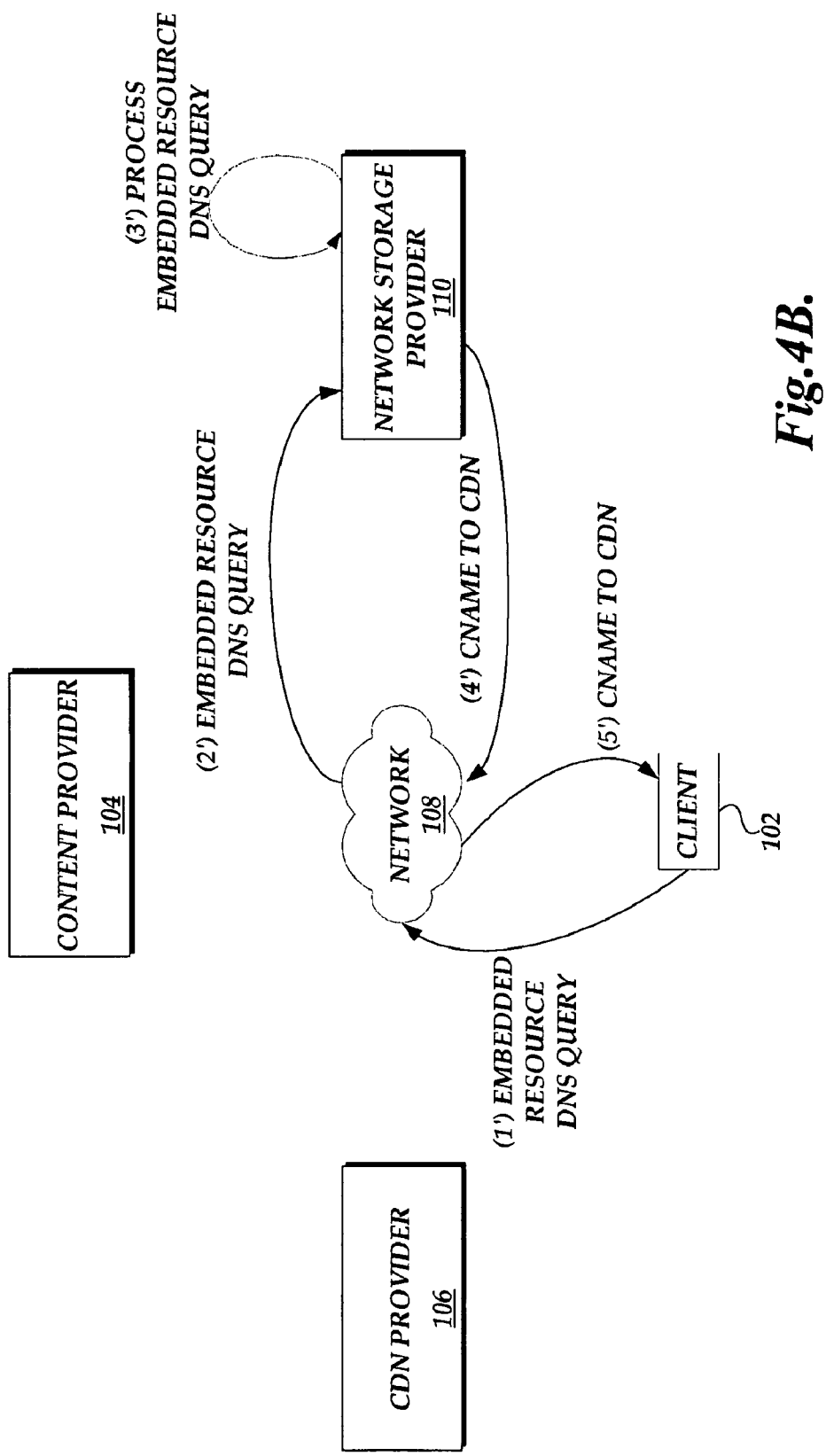
FIG. 4B is a block diagram of the content delivery environment of FIG. 1 illustrating another embodiment of the processing of resultant CDN registration information.

In another embodiment, the information associated with the CDN service provider 106 is included the modified URL, such as through prepending or other techniques, such that the translated URL can maintain all of the information associated with the original URL. In this embodiment, the translated URL would have the form of:

http://additional information.cdnprovider.com/www.storageprovider.com/path/resource.xxx With reference now to FIG. 4B, another embodiment of processing information as a result of registering one or more resources with the CDN provider 106 will be described. Instead of requesting the content provider 104 to translate one or more embedded resources to be provided by the CDN service provider 106 as described in reference to FIG. 4A, the network storage provider 110 may alternatively process CDN registration information from the CDN service provider 106 itself such that the network storage provider 110 would provide an alternative resource identifier responsive to a received client request for an embedded resource to the CDN service provider 106. Specifically, instead of providing an embedded resource from a storage component 140, 144, 148 of the network storage provider 110 upon receiving a request from a client computing device 102 for the embedded resource, the network storage provider 110 can maintain sets of various alternative resource identifiers based on CDN registration information received from the CDN service provider 106. The alternative resource identifiers can be provided by the network storage provider 110 to the client computing device 102 such that a subsequent DNS query on the alternative resource identifier will resolve to a DNS server component within the CDN service provider's network. In this embodiment, a DNS name server associated with the network storage provider 110 (directly or indirectly) is able to receive the DNS query (corresponding to the domain in the embedded resource). However, as discussed above, because the DNS name server does not provide a responsive IP address to the query, it is not considered authoritative to the DNS query. Instead, the network storage provider 110 selects (or otherwise obtains) an alternative resource identifier that is intended to resolve to an appropriate DNS server of the CDN service provider 106 based on a variety of criteria. For example, the network storage provider may select an alternative resource identifier based on a regional service plan or service level information obtained from the content provider. As will be described further below, this additional information may also be used for further request routing.

In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL. Additionally, each CNAME record includes additional information, such as request routing information, (e.g., "request routing information"). An illustrative CNAME record can have the form of:

request_routing_information.cdnprovider.com

In accordance with an illustrative embodiment, the network storage provider 110 maintains a data store that defines CNAME records for various URLs corresponding to embedded resources stored by the network storage provider 110. If a DNS query corresponding to a particular URL matches an entry in the data store, the network storage provider 110 returns a CNAME record to the client computing device 102 as defined in the data store and as illustrated in FIG. 4B.

The returned CNAME can also include request routing information that is different from or in addition to the information provided in URL of the current DNS query. For example, if the CNAME selection is based on a regional service plan or a service level plan selected by the content provider 104, a specific identifier can be included in the "request_routing_information" portion of the specific CNAME record. In another embodiment, request routing information can be found in the identification of a CDN service provider 106 domain different from the domain found in the original URL. For example, if the CNAME is based on a regional plan, a specific regional plan domain (e.g., "cdn-provder-region1.com") could be used in the domain name portion of the specific CNAME record. Any additional request routing information can be prepended to the existing request routing information in the original URL such that the previous request routing information would not be lost (e.g., http://serviceplan.regionalplan.cdnprovider.com). One skilled in the relevant art will appreciate that additional or alternative techniques and/or combination of techniques may be used to include the additional request routing information in the CNAME record that is identified by the network storage provider 110.

In another illustrative embodiment, prior to redirecting client DNS queries for embedded resources to the CDN service provider 106, the network storage provider 110 may also request that the content provider 104 modify the original resource identifiers so that subsequent client requests for the embedded resources are directed to the network storage provider 110 using a non-circular resource identifier.

Figure 5:
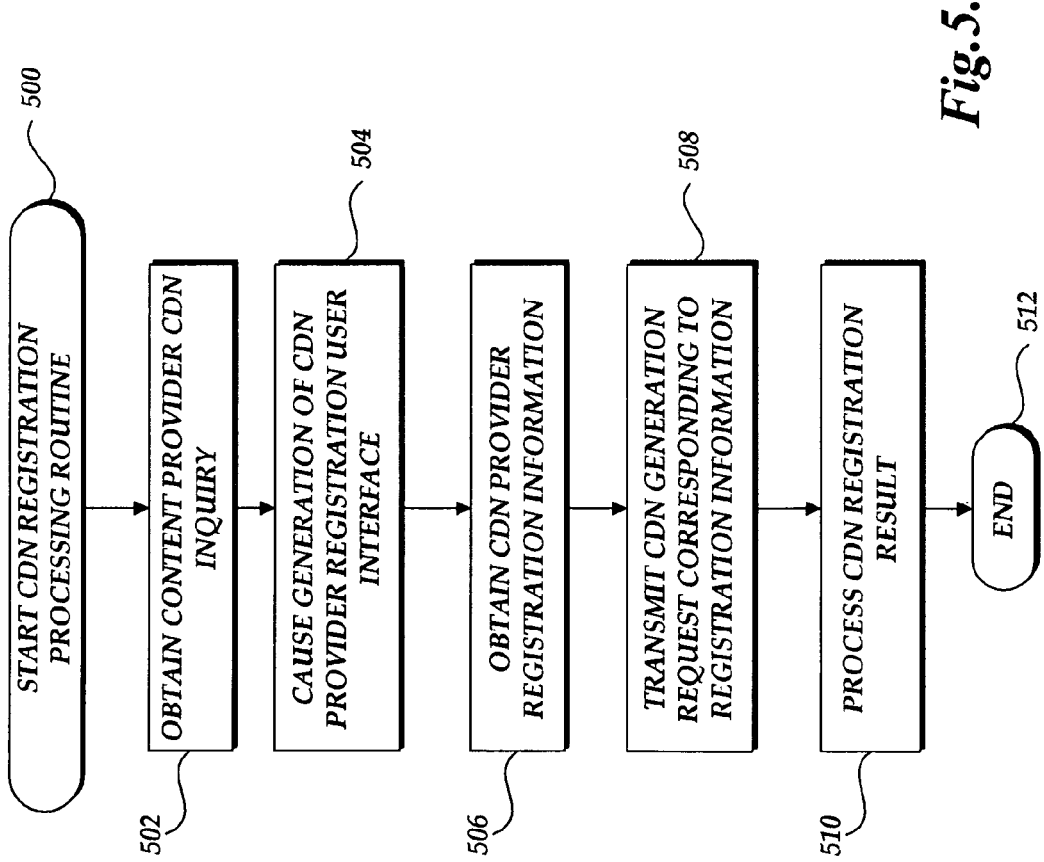
FIG. 5 is a flow diagram illustrative of a CDN registration processing routine implemented by a network storage provider.

With reference now to FIG. 5, one embodiment of a routine 500 implemented by the network storage provider 110 for managing registration of one or more resources stored on behalf of a content provider 104 with a CDN service provider 106 will be described. One skilled in the relevant art will appreciate that actions/steps outlined for routine 500 may be implemented by one or many computing devices/components that are associated with the network storage provider 110. Accordingly, routine 500 has been logically associated as being generally performed by the network storage provider 110, and thus the following illustrative embodiments should not be construed as limiting.

At block 502, the network storage provider 110 optionally obtains a CDN inquiry from a content provider 104 on behalf of which the network storage provider 110 hosts content. The CDN inquiry requests initial information regarding the potential use of a CDN service provider 106 to provide one or more resources on behalf of the content provider 104. In one embodiment, the content provider 104 may desire to register individual object files, such as those corresponding to embedded resources. In addition or alternatively, the content provider 104 may desire to register all objects associated with a resource, such as a particular domain.

In response to the CDN inquiry or even without requiring an initial CDN inquiry, the network storage provider 110 causes a user interface for registering one or more resources with a CDN service provider 106 to be generated at block 504. The network storage provider 110 accordingly obtains information to be provided as a part of the CDN registration user interface. For example, in one portion of the user interface, the network storage provider 110 may provide, and hence obtain, an identification of one or more resources currently hosted by the network storage provider 110 on behalf of the content provider 104, such as an embedded resource name, an embedded resource type, a current domain associated with the embedded resource, a size of the embedded resource, and the like. The network storage provider 110 may also obtain and provide additional information in the user interface, such as a number of times each of the one or more resources has been requested by a client computing device 102, a recommended CDN provider, an option to select one or more available CDN service providers, one or more options corresponding to CDN selection criteria such as a regional service plan or a service level plan, and the like. Even further, the CDN registration user interface includes a CDN selection component that provides a content provider an option to initiate publication of the one or more resources to a CDN service provider.

In one illustrative embodiment, rather than obtaining an initial CDN inquiry from a content provider 104, the network storage provider 110 may determine that a recommendation to use a CDN to provide a particular resource should be provided. Based on this determination, the network storage provider 110 would cause the CDN registration user interface to be generated. For example, the network storage provider 110 may monitor the volume of requests for each resource. If an embedded resource, such as one with a relatively large file size, has been requested a high number of times, the network storage provider 110 may determine that this embedded resource is a candidate for being provided by a CDN service provider and accordingly generate a corresponding recommendation.

In another illustrative embodiment, the network storage provider 110 can determine whether to make a CDN recommendation based on a variety of criteria, such as cost to the content provider, quality of service, throughput, content provider contractual obligations, latency, internet weather, and the like. Even further, the network storage provider 110 can utilize a web service to determine whether to make a particular CDN recommendation. For example, the network storage provider 110 can utilize the testing system disclosed in U.S. patent application Ser. No. 12/240,740, titled "Service Provider Optimization of Content Management" and hereby incorporated by reference, to make CDN recommendations. Yet further, in other embodiments, the network storage provider 110 can recommend registration with one or more CDN service providers.

Continuing with FIG. 5, at block 506, the network storage provider 110 obtains CDN provider registration information from the content provider 104. The CDN provider registration information includes a request from the content provider 104 to publish one or more resources to a CDN service so that the CDN service provider 106 provides the one or more resources on behalf of the content provider 104. The CDN provider registration information can also include other information obtained from the content provider 104 such as an identification of a particular CDN service provider, a select regional plan, a select service level plan, and the like. The network storage provider 110 also obtains any additional CDN provider registration information, whether from the content provider or otherwise, which may be needed to register the one or more resources with the CDN service provider. The additional CDN provider registration information may include an identification of the one or more resources requested to be published to a CDN service, content provider billing information, network storage provider billing information, and the like. As similarly set forth above, the identification information associated with the one or more resources may include any one or more of the embedded resource name, the embedded resource type, the current domain, the size of the embedded resource, and the like. In one illustrative embodiment, the network storage provider 110 obtains all CDN provider registration information necessary to register the one or more resources with the CDN service provider 106 on behalf of the content provider 104 in a single request.

Next, at block 508, the network storage provider 110 transmits a CDN generation request associated with the obtained CDN registration information to the CDN service provider 106. At block 510, the network storage provider 110 then processes data corresponding to the resultant registration of the one or more resources with the CDN service provider. In one illustrative embodiment, the network storage provider 110 requests or otherwise causes the content provider 104 to modify one or more resource identifiers corresponding to the one or more resources so that subsequent requests for the one or more resources are directed to the CDN service provider 106. In an alternative embodiment, the network storage provider 110 obtains an alternative resource identifier corresponding to each of the one or more resources so that the network storage provider 110 can redirect client requests for the one or more resources to the CDN service provider 106. In either of the foregoing embodiments, the network storage provider 110 may also notify the content provider 104 that the one or more resources have been registered with the CDN service provider 106. The routine 500 ends at block 512.

Although many of the above described embodiments disclose use a user interface and receive input responsive to human interaction, the content provider 104 and the network storage provider 110 may interact via a series of API calls. In such embodiments, the content provider 104 or the network storage provider 110 may programmatically process the APIs, e.g., in accordance with defined business rules or other logic such that additional human interaction is not necessary. Accordingly, the present application should not be limited to use of a user interface. For example, rather than generating a user interface at block 504, the network storage provider 110 may generate an API call to the content provider 104 similarly requesting a determination be made regarding whether a CDN service provider should be used to host content on behalf of the content provider 104. Likewise, the content provider 104 can automatically process the API and return information to the network storage provider 110.

Figure 6:
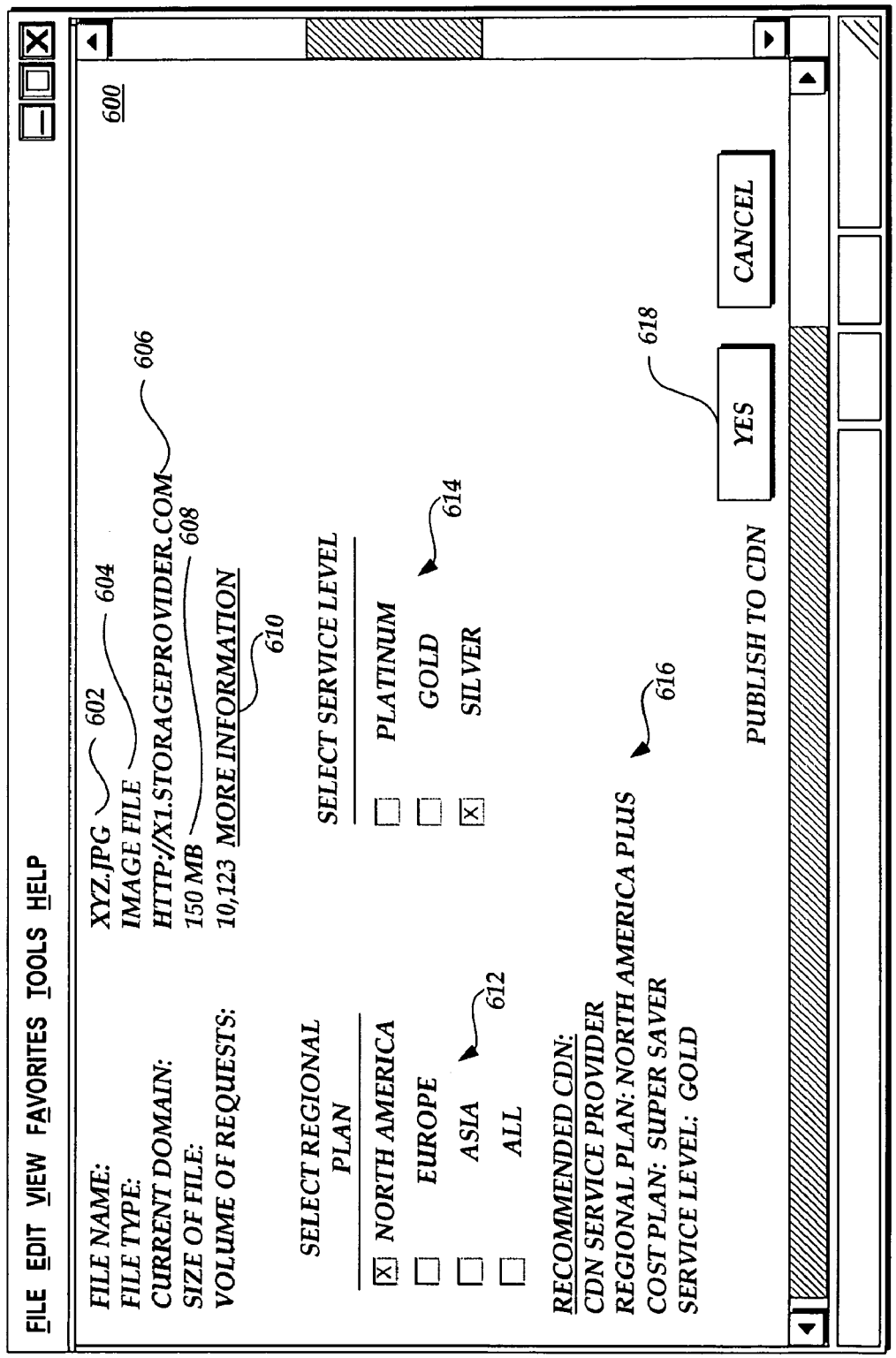
FIG. 6 is an illustrative user interface displaying information for use in registering with a content delivery network service provider.

With reference now to FIG. 6, one illustrative embodiment of a user interface or screen display 600 in which information for registering one or more resources with a CDN service provider 106 will now be described. In this illustrative embodiment, the screen display 600 is a Web page illustrating a presentation of content regarding the potential registration of a particular resource with a CDN service provider 106. The screen display 600 includes a CDN selection component 618 which when selected causes a request to register the identified resource with a CDN service provider 106 to be sent to the network storage provider 110. In one embodiment, with respect to a particular embedded resource, the screen display 600 also includes information identifying the embedded resource, such as an embedded resource name 602, an embedded resource type 604, a current domain associated with the embedded resource 606, and a size of the embedded resource 608. The screen display 600 further includes information identifying a number of times the embedded resource has been requested from the network storage provider 110, as well as a link 610 corresponding to an identifier that when selected provides more detailed information regarding client requests for the embedded resource. In another embodiment, where the resource corresponds to a domain of the content provider, the screen display 600 could also similarly include information associated with the domain, such as a domain identification, a number of requests associated with the domain, a number of embedded resources associated with the domain, and the like.

In another portion of the screen display 600, CDN selection criteria are provided. For example, a regional plan selection component 612 and a service level selection component 614 are provided to allow the content provider 104 to select desired parameters associated with a CDN service provider 106. Finally, the display screen 600 includes a specific CDN service provider recommendation 616 generated by the network storage provider 110. As similarly set forth above, the recommendation may identify one or more CDN service providers for hosting content on behalf of the content provider.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached Figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method comprising:
    obtaining a CDN inquiry from a content provider at a network storage provider, wherein the CDN inquiry corresponds to a request to register one or more resources with a CDN service provider and wherein the one or more resources are currently hosted by the network storage provider on behalf of the content provider;
    causing generation, by the network storage provider, of a user interface for registering the one or more resources with a CDN service provider, wherein the user interface includes an option to have the one or more resources hosted by the CDN service provider in the alternative to the network storage provider;
    obtaining registration information at the network storage provider for registering the one or more resources associated with the content provider with the CDN service provider, the registration information including a request by the content provider to register the one or more resources with a CDN provider, identification of the one or more resources to be provided by the CDN service provider, and CDN selection criteria;
    transmitting a CDN generation request from the network storage provider to the CDN service provider, the CDN generation request corresponding to the registration information; and
    processing data corresponding to the registration of the one or more resources with the CDN service provider.

2. The method as recited in claim 1, wherein the one or more resources correspond to one or more embedded resources.

3. The method as recited in claim 1, wherein the one or more resources correspond to a domain associated with the content provider.

4. The method as recited in claim 1, wherein processing data corresponding to the registration of the one or more resources with the CDN service provider comprises notifying the content provider of the registration of the one or more resources with the CDN service provider_without receiving a request from the content provider for the notification.

5. The method as recited in claim 4, wherein processing data corresponding to the registration of the one or more resources with the CDN service provider further comprises sending a request from the network storage provider for the content provider to modify one or more resource identifiers corresponding to the one or more resources so that subsequent requests for the one or more resources are directed to the CDN service provider.

6. The method as recited in claim 1, wherein processing data corresponding to the registration of the one or more resources with the CDN service provider comprises sending a request from the network storage provider for the content provider to modify one or more resource identifiers corresponding to the one or more resources so that subsequent requests for the one or more resources are directed to the CDN service provider.

7. The method as recited in claim 1, wherein processing data corresponding to the registration of the one or more resources with the CDN service provider comprises obtaining, at the network storage provider, an alternative resource identifier corresponding to each of the one or more resources, wherein the alternative resource identifier corresponds to an identification of the CDN service provider for providing the associated resource.

8. The method as recited in claim 1 further comprising:
    obtaining a DNS query from a client computing device at a first DNS server of the network storage provider, wherein the DNS query corresponds to a requested resource associated with an original resource identifier provided by a content provider and wherein the network storage provider is different from the content provider;
    determining whether the first DNS server is authoritative to the DNS query;
    obtaining an alternative resource identifier if the DNS server is determined not to be authoritative, wherein the alternative resource identifier includes information for causing a DNS query to resolve to a domain corresponding to the CDN service provider and request routing information not included in the original resource identifier; and
    transmitting the alternative resource identifier to the client computing device.

9. The method as recited in claim 1, wherein the CDN selection criteria comprises a service level plan provided by a CDN service provider.

10. The method as recited in claim 1, wherein the CDN selection criteria comprises a regional level plan provided by a CDN service provider.

11. The method of claim 1, wherein the user interface includes identification of a number of times each of the one or more resources has been requested by a client computing device.

12. The method of claim 1, wherein the user interface includes an identification of one or more CDN service providers recommended by the network storage provider based on an evaluation of past requests made to the network storage provider for the one or more resources.

13. A method comprising:
    determining that use of a content delivery network (CDN) service provider should be recommended by a network storage provider to a content provider based on an evaluation of past requests made to the network storage provider for the one or more resources, wherein the one or more resources are stored and provided by the network storage provider on behalf of the content provider;
    providing an identification of a recommended CDN service provider to the content provider from the network storage provider without receiving a prior request from the content provider to use a CDN service provider to provide at least one of the one or more resources;
    obtaining registration information at the network storage provider for registering one or more resources associated with the content provider with a CDN service provider;
    transmitting a CDN generation request from the network storage provider to the CDN service provider, the CDN generation request corresponding to the registration information.

14. The method as recited in claim 13, wherein the one or more resources correspond to one or more embedded resources.

15. The method as recited in claim 13, wherein the one or more resources correspond to a domain associated with the content provider.

16. The method as recited in claim 13, wherein the registration information includes identification of the one or more resources to be provided by the CDN service provider and CDN selection criteria provided by the content provider.

17. The method as recited in claim 16, wherein the CDN selection criteria comprises a service level plan corresponding to a CDN service provider.

18. The method as recited in claim 16, wherein the CDN selection criteria comprises a regional level plan corresponding to a CDN service provider.

19. The method as recited in claim 13 further comprising:
    causing generation, by the network storage provider, of a user interface for registering the one or more resources with a CDN service provider.

20. The method as recited in claim 19, wherein the user interface provides an option for a content provider to select to register with a CDN service provider by selection of a single control.

21. The method as recited in claim 19, wherein the user interface provides identification of one or more recommended CDN service providers.

22. The method as recited in claim 19 further comprising:
    obtaining a CDN inquiry from a content provider at the network storage provider, wherein the CDN inquiry corresponds to an initial request to register one or more resources with a CDN service provider.

23. The method as recited in claim 13 further comprising:
    causing generation, by the network storage provider, of an API call for registering the one or more resources with a CDN service provider.

24. The method as recited in claim 13 further comprising:
    notifying the content provider of the registration of the one or more resources with the CDN service provider without receiving a request from the content provider for the notification.

25. The method as recited in claim 13 further comprising:
    sending a request from the network storage provider for the content provider to modify one or more resource identifiers corresponding to the one or more resources so that subsequent requests for the one or more resources are directed to the CDN service provider.

26. The method as recited in claim 13 further comprising:
    obtaining, at the network storage provider, an alternative resource identifier corresponding to each of the one or more resources, wherein the alternative resource identifier corresponds to an identification of the CDN service provider for providing the associated resource.

27. A non-transitory computer readable medium for storing computer executable components for managing registration of content with a CDN service provider, the computer readable medium comprising:
    a first component for:
        identifying one or more resources associated with a content provider;
        determining that use of a content delivery network (CDN) service provider should be recommended by the network storage provider to the content provider based on an evaluation of past requests made to the network storage provider for the one or more resources, wherein the one or more resources are stored by the network storage provider on behalf of the content provider; and
        providing an identification of a recommended CDN service provider to the content provider from the network storage provider without receiving a prior request from the content provider to use a CDN service provider to provide at least one of the one or more resources; and
    a second component that when selected causes a network storage provider to register the one or more resources with a CDN service provider.

28. The non-transitory computer readable medium as recited in claim 27, wherein the first component further comprises identifying a current storage location of each of the one or more resources.

29. The non-transitory computer readable medium as recited in claim 27, wherein the first component further comprises identifying a number of prior requests made to the network storage component for each of the one or more resources.

30. The non-transitory computer readable medium as recited in claim 27 further comprising:
    a third component for obtaining a desired regional service plan associated with the CDN service provider.

31. The non-transitory computer readable medium as recited in claim 27 further comprising:
    a third component for obtaining a desired service level plan associated with the CDN service provider.

32. The non-transitory computer readable medium as recited in claim 27 further comprising:
    a third component for identifying one or more recommended CDN service providers based on information associated with the one or more resources.

* * * * *